United States Patent [19]

Weinrieb

[11] Patent Number: 4,504,059
[45] Date of Patent: Mar. 12, 1985

[54] SUPPORT APPARATUS FOR VIDEO GAME JOYSTICK CONTROL UNIT

[76] Inventor: Steven W. Weinrieb, 8717 Cold Spring Rd., Potomac, Md. 20854

[21] Appl. No.: 430,236

[22] Filed: Sep. 30, 1982

[51] Int. Cl.³ .............................................. A63B 71/04
[52] U.S. Cl. ................................ 273/148 B; 312/242
[58] Field of Search ................ 108/28; 206/477, 480, 206/483, 486, 487, 490; 312/204, 223, 292, 242; 70/159, 160, 246, 247, 59, 61

[56] References Cited

U.S. PATENT DOCUMENTS

| 1,726,732 | 9/1929 | Doran | 206/486 |
| 1,803,028 | 4/1931 | Menten | 206/486 |
| 3,240,425 | 3/1966 | Ray et al. | 312/223 X |
| 4,155,458 | 5/1979 | Moline | 70/61 |
| 4,395,134 | 7/1983 | Luce | 368/10 |

Primary Examiner—William E. Lyddane
Assistant Examiner—Joseph Falk
Attorney, Agent, or Firm—Schwartz & Weinrieb

[57] ABSTRACT

Support apparatus (10) for a video game control unit (20) includes a base member (12) and a cover member (14) pivotably secured thereto. Recessed sockets (22) and (24) are provided within the base (12) and the cover (14) members for securely housing the control unit (20) when the cover (14) is secured in its closed position relative to the base (12). The cover (14) includes central aperture means (26) for permitting the joystick (28) of the unit (20) to project vertically upwardly out of the apparatus (10), and a rectangular cut-out section (32) which also facilitates access to a pushbutton control element (30) of the unit (20). Slot-type conduit means (36) is provided within the base (12) for accommodating the control unit power cord (34), and the base member (112) could have a substantially C-shaped or inverted U-shaped configuration whereby the support apparatus may be disposed in an overlying relationship relative to one's legs or lap if the video game player is sitting within a chair or upon a room floor.

7 Claims, 3 Drawing Figures

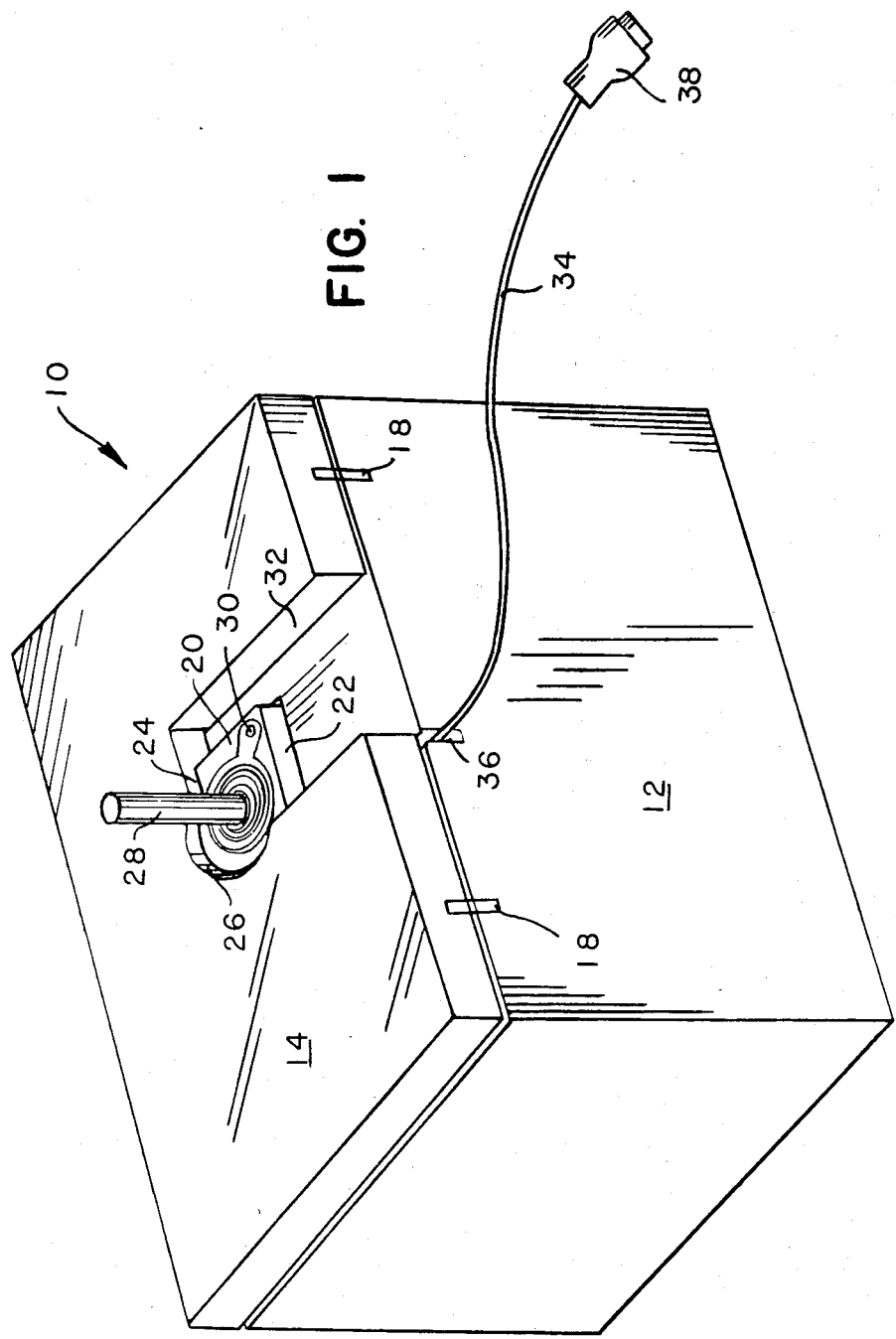

SUPPORT APPARATUS FOR VIDEO GAME JOYSTICK CONTROL UNIT

TECHNICAL FIELD

The present invention relates generally to amusement devices, and more particularly to support apparatus for housing a video game control unit of the joystick type.

BACKGROUND ART

As statistics will certainly attest to, video game amusement devices have become an immensely popular form of entertainment in our culture within a relatively short period of time. Within the past five years, for example, the video game industry has burgeoned to such a degree that revenues are now at the billion dollar level as generated within commercial video game arcade establishments. In addition to the aforenoted commercial market, the home-video market is also quite extensive and is continuously experiencing substantial growth as new households acquire video game systems, and in view of households, which already have video game systems, continually adding to such systems by purchasing new game cartridges as the same become commercially available.

Within the home video game entertainment field or market, one of the original most popular game cartridges utilized, for example, in connection with an ATARI home video game system, is SPACE INVADERS. More recently, the video game cartridge of PAC-MAN has become available for use in connection with home video game systems, and this particular cartridge has likewise proven to be quite commercially successful.

These two exemplary video games are played in conjunction with the ATARI video game system through means of a joystick control unit which is movable, for example, in four mutually orthogonal directions which may correspond to what may be considered or envisioned North, South, East, and West directions. In particular, the movements required during a playing episode of SPACE INVADERS normally involve only movements within the East and West directions, while the movements required during a playing episode of PACMAN require movements within all of the North, South, East and West directions. The movements required within either video game play modes are often extremely tense and rapid. The joystick control unit is usually held within one particular hand while the other hand is actually used to move the joystick control shaft to accomplish play of the game.

As often happens, after a substantial period of play time, and particularly in view of the intensity of the required play movements of the joystick shaft, the hand that is simply holding the joystick control unit becomes cramped and over-tired due to the rapid and intense movement forces being impressed upon the joystick control shaft by means of the other hand. In other words, the person's hand holding the joystick control unit must balance the forces being impressed upon the joystick control shaft by means of the moving-playing hand. As a result, as already noted, the hand holding the unit becomes tired and cramped with a consequent decrease in efficiency of play as exhibited by the control-movement hand.

A need therefore exists for suitable support apparatus for the joystick control unit which will eliminate the necessity of the unit actually being held within one of the person's hands while the other hand accomplishes movement of the joystick control shaft in the desired mode. In this manner, the person's hand which normally is required to hold the joystick control unit is relieved of such duty and does not undergo or experience the cramping and over-tired symptoms normally experienced when utilizing the control unit. The apparatus would securely hold and support the control unit while the other hand can freely and efficiently manipulate the joystick control shaft.

Accordingly, it is an object of the present invention to provide new apparatus for supporting and retaining a video game joystick control unit.

Another object of the present invention is to provide a new apparatus for supporting and retaining a video game joystick control unit so as to overcome and alleviate the operational drawbacks, disadvantages, and problems normally characteristic of a video game joystick control unit during its play mode.

Still another object of the present invention is to provide a new apparatus for supporting and retaining a video game joystick control unit whereby cramping and over-tiring of the game-player's hand conventionally holding the joystick control unit is operationally eliminated or relieved.

Yet another object of the present invention is to provide a new apparatus for supporting and retaining a video game joystick control unit so as to permit operational control of the joystick control unit with only a single hand.

Still yet another object of the present invention is to provide a new apparatus for supporting and retaining a video game joystick control unit whereby personnel fatigue is substantially reduced or eliminated so as to permit substantially extended play of the video game system with substantially increased efficiency.

Yet still another object of the present invention is to provide a new apparatus for supporting and retaining a video game joystick control unit which is quite simplified in its structural formulation.

A further object of the present invention is to provide a new apparatus for supporting and retaining a video game joystick control unit which exhibits a minimal number of cooperative working parts or elements and which is relatively inexpensive to manufacture wherein the video game joystick control unit is nevertheless securely retained within the apparatus so as to efficiently serve as the supporting base for the joystick control shaft when the latter is being manipulated in accordance with the particular game movement modes as may be required.

A still further object of the present invention is to provide a new apparatus for supporting and retaining a video game joystick control unit which is capable of being disposed upon a flat support surface, such as, for example, a room floor, a horizontally disposed table surface, or the like, as may be desired by the particular personnel employing the same.

A yet further object of the present invention is to provide a new apparatus for supporting and retaining a video game joystick control unit which is capable of being disposed over one's legs or lap in any overlying mode as may be desired by the particular personnel employing the same so as to comfortably dispose the apparatus and the joystick control unit relative to the person playing the video game system.

A still yet further object of the present invention is to provide a new apparatus for supporting and retaining a video game joystick control unit which operatively disposes the joystick control unit in a comfortable position relative to the person utilizing the same while playing the video game system.

A yet still further object of the present invention is to provide a new apparatus for supporting and retaining a video game joystick control unit which operatively supports and retains therewithin the joystick control unit without interference with any movement of the joystick control shaft.

An additional object of the present invention is to provide a new apparatus for supporting and retaining a video game joystick control unit which operatively supports and retains therewithin the joystick control unit without hindering access to the push-button control element conventionally provided upon the joystick control unit and which is operatively employed in conjunction with the joystick control shaft.

DISCLOSURE OF THE INVENTION

The foregoing and other objectives of the present invention are achieved through the provision of a rectangular housing, either having a rectangular parallelepiped configuration or a substantially inverted U-shaped configuration as viewed from a front elevation point of view. In either embodiment, the housing is provided with a pivotable cover which may be lockingly fastened to the housing base when the apparatus is to be utilized in conjunction with a video game joystick control unit. In addition, the housing cover and base both have mating socket means defined therewithin for confining the joystick control unit within the housing when the unit is placed within the housing during an operative mode. Alternatively, the socket means may only be provided within the housing base and the cover lockingly fastened to the housing base thereby still serving to retain the video control unit within the apparatus housing.

Slot means is defined within the housing case for providing the video game joystick control unit with its operative power cord, the slot means of course leading to the socket within which the control unit is to be disposed. In addition, the housing cover, in addition to having the central-most portion thereof provided with a circular aperture for facilitating access to, and movement of, the joystick control unit, also has a portion thereof cut-out in the form of substantially a rectangle in order to facilitate access to the push-button control element conventionally provided upon video joystick control units.

In utilizing the support apparatus of the present invention, the joystick control unit is disposed within the housing by placing the same within the housing socket, and the power cord for the control unit may be disposed within the housing slot, the housing cover having of course been pivotally raised to its open position. Once the control unit is disposed within the housing socket, the cover may be pivoted downwardly and suitably fastened to the housing base so as to securely retain the control unit within the housing during usage of the control unit in playing a particular video game.

In utilizing either embodiment of the support apparatus of the present invention, it will be appreciated that by disposing the control unit within the support apparatus of the present invention, the latter has relieved the game player of the necessity, inconvenience, and uncomfortability, accompanying extended play of video games, of having to hold or retain the joystick control unit within one's hand. To the contrary, with the support apparatus of the present invention, the user-player can comfortably utilize the support apparatus as a support means for the person's arms to prevent fatigue, and more importantly to brace and balance oneself during impression of forces upon the joystick control unit in a rapid fashion as is often required during the playing of the particularly aforenoted video games. It is particularly noted that with the rectangular parallelepiped embodiment of the support apparatus of the present invention, the user-player can actually lean on the housing apparatus to support oneself during a play mode, while with the inverted U-shaped support apparatus housing, the same may be disposed over one's legs or lap while, for example, sitting upon a room floor.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a perspective view of the new and improved support apparatus of the present invention showing the cooperative parts thereof with a video game joystick control unit housed therewithin;

BEST MODE FOR CARRYING OUT THE INVENTION

Figure 2:
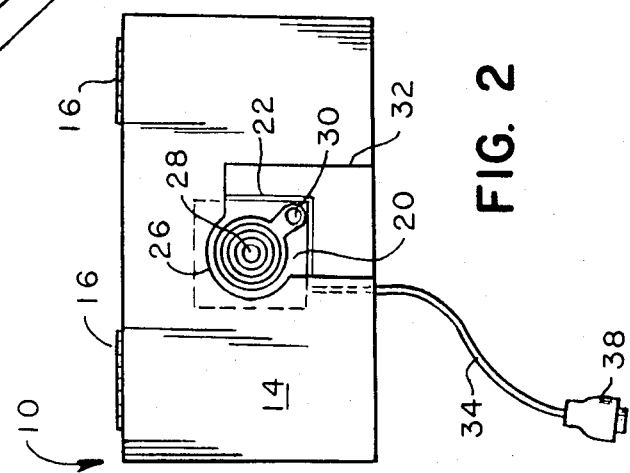
FIG. 2 is a plan view of the apparatus of FIG. 1.

Referring now to the drawings, and more particularly to FIGS. 1 and 2 thereof, there is shown the new and improved video game joystick control unit support apparatus constructed in accordance with the present invention and generally indicated by the reference character 10. The apparatus includes a housing which comprises a base 12 and a cover 14 pivotally secured thereto by, for example, suitable hinge mechanisms 16 fixedly secured to the base 12 and cover 14 along the common or mating rear edge portions thereof. The entire support apparatus comprising the housing base 12 and cover 14 may be fabricated from a suitable plastic material which is substantially light in weight and yet exhibits requisite strength characteristics so as to provide the apparatus with a considerably long service life, or alternatively, the housing can be fabricated, for example, of wood, a light-weight metal such as aluminum, or the like. Suitable fastening means 18 are provided upon the front vertical surfaces of the housing cover 14 and base 12 in order to fixedly close and lock the cover 14 in its downward or closed position relative to base 12.

In order to house the video game joystick control unit 20 within the apparatus of the present invention in a snug fitting manner such that excessive "play" or movement is not encountered during a typical play mode in which a user-player exerts considerable force upon the control unit in various directions, the base 12 is provided with a centrally located socket means 22 recessed downwardly or countersunk within the base 12. The depth of the recessed socket 22 is substantially one-half the height or vertical thickness of the control unit 20, and the cover 14 is likewise provided with a mating socket means 24 which is likewise countersunk or recessed upwardly within the cover 14. The depth of the recess 24 is also substantially one-half the thickness or vertical height of the control unit 20, although this may vary between the cover 14 and base 12. In fact, the control unit 20 may alternatively be entirely recessed within the base 12 such that the upper horizontal surface of the control unit 20 is substantially flush with the upper surface of the base 12, in which case the cover 14 does not have a recessed socket and simply pivots downwardly and upwardly to cover or uncover the control unit during, for example, a play mode or when the control unit is desired to be removed from the support apparatus.

The cover 14 is provided with a central circular aperture 26 in order to permit the joystick 28 of the control unit 20 to project upwardly through the cover and thereby be accessible to the game-playing personnel. In addition, as the conventional video game joystick-type is also provided with a push-button control element 30, access to the same must also be provided. This last-mentioned access means takes the form of a rectangularly shaped cut-out section 32 defined within the cover 14. Lastly, in order to provide proper housing of the joystick control unit 20 and its associated power cord 34, without the latter being straitened between the cover and the base when the cover 14 is securely fastened to the base 12, a rearwardly extending slot or conduit 36 is defined within the upper surface of the housing base 12, the slot ultimately connecting with the recessed socket 22 of the base 12 such that when the control unit 20 is disposed within the socket 22, the power cord 34 can be appropriately routed out of the support apparatus and connected to the video game unit, not shown, by means of the power cord jack or plug 38.

Figure 3:
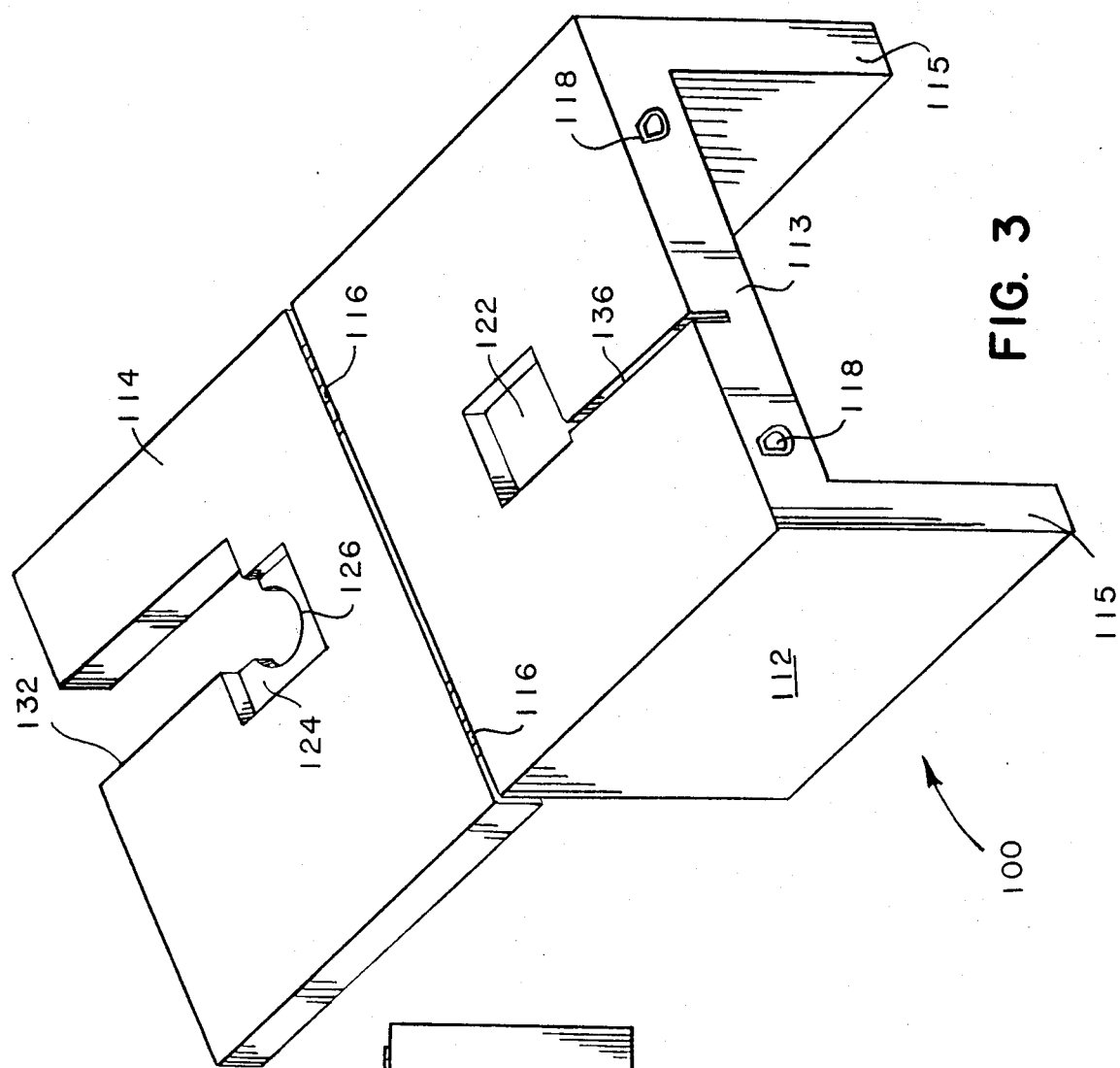
FIG. 3 is a perspective view of another embodiment of the support apparatus of the present invention, the apparatus housing having its cover disposed within its open position.

Referring now to FIG. 3, there is shown another embodiment of the present invention generally indicated by the reference character 100. The embodiment of FIG. 3 is substantially the same as that of FIGS. 1 and 2, and consequently, the similar parts thereof are designated by similar reference characters with the note that they are now denoted within the "100" series. The primary difference between the support apparatus of this embodiment and the embodiment of FIGS. 1 and 2 resides in the fact that the housing base 112 is substantially C-shaped or of an inverted U-shaped configuration. In particular, the housing 112 comprises an upper, horizontally disposed support surface 113 and dependent sidewalls 115. In this manner, this particularly embodied support apparatus is well-suited to be utilized by a video game player when the player is, for example, sitting upon a chair, a room floor, or the like, and the support apparatus 100 can be disposed in an overlying relationship relative to the player's legs or lap.

Obviously, many modifications and variations of the present invention are possible in light of the above teachings. It is therefore to be understood that within the scope of the appended claims, the present invention may be practiced otherwise than as specifically described herein.

I claim:
1. Support apparatus for a joystick control unit, comprising:
  a base member;
  a cover member;
  socket means defined between said base member and said cover member for housing the joystick control unit within said apparatus, said socket means being sized so as to accommodate the joystick control unit to substantially preclude movement thereof in any direction;
  said cover member being pivotably secured to said base member between open and closed positions relative to said base member and said socket means so as to permit access to said socket means when said cover member is disposed in said open position, and to operatively cooperate with said base member in fixedly retaining the joystick control unit within said socket means when said cover member is disposed in said closed position;
  aperture means defined within said cover member for permitting the joystick of the joystick control unit to project outwardly of said support apparatus when said cover member is disposed in said closed position whereby access to the joystick is provided from a position external of said apparatus; and
  fastening means disposed externally upon said apparatus for securing said pivotably cover member in said closed position relative to said base member, and for releasing said pivotable cover member relative to said base member so as to enable said cover member to be moved to said open position.

2. Support apparatus as set forth in claim 1, wherein:
  said socket means is defined within said base member in a recessed or countersunk manner; and
  said cover member overlies both said socket means and said joystick control unit when said cover member is disposed in its closed position.

3. Support apparatus as set forth in claim 1, wherein:
  both of said base member and said cover member have socket means defined therewithin for housing said control unit.

4. Support apparatus as set forth in claim 1, wherein:
  said control unit is provided with a push-button control element; and
  said cover member has a cut-out portion defined therein for permitting access to said push-button control element in addition to said joystick of said joystick control 5. Support apparatus as set forth in claim 1, further comprising:
  slot means defined within said base member for accommodating the power cord of said joystick control unit.

6. Support apparatus as set forth in claim 1, wherein:
  said base member has the configuration of an inverted U.

7. Support apparatus as set forth in claim 1, wherein:
  said joystick control unit is a video game joystick control unit.

* * * * *